United States Patent [19]

Conerly

[11] 3,770,893

[45] Nov. 6, 1973

[54] CAMA/LAMA TRANSVERTER

[75] Inventor: Howard Jeffery Conerly, Milan, Tenn.

[73] Assignee: International Telephone and Telegraph Corporation, New York, N.Y.

[22] Filed: May 8, 1972

[21] Appl. No.: 251,306

[52] U.S. Cl. .......... 179/7 MM
[51] Int. Cl. .......... H04m 15/06
[58] Field of Search .......... 179/7 MM, 7 R, 7.1 R, 179/7.1 TP

[56] References Cited

UNITED STATES PATENTS

| | | | |
|---|---|---|---|
| 3,651,269 | 3/1972 | Le Strat et al. | 179/7.1 R |
| 3,697,695 | 10/1972 | Pommerening et al. | 179/7 MM |
| 3,160,709 | 12/1964 | Burke | 179/7 MM |

*Primary Examiner*—Kathleen H. Claffy
*Assistant Examiner*—Kenneth D. Baugh
*Attorney*—C. Cornell Remsen, Jr. et al.

[57] ABSTRACT

A system is disclosed for automatically gathering, recording and ticketing billing data for station-to-station telephone calls. The system employs electronic logic circuits which are responsive to signals identifying the calling party and the called party and indicating the status of a call to generate billing data for a finished call in the form of initial entry signals answer/disconnect signals and time signals. The billing data is supplied to a core memory where it is stored. The core memory empties into a tape memory periodically after the recorded data has been checked for accuracy.

8 Claims, 19 Drawing Figures

PATENTED NOV 6 1973 3,770,893

SHEET 02 OF 17

PATENTED NOV 6 1973

3,770,893

SHEET 10 OF 17

CAMA/LAMA TRANSVERTER

BACKGROUND OF THE INVENTION

1. Field of the Invention

The present invention relates to the automatic gathering, recording, and ticketing of billing data for telephone toll calls. It particularly relates to electronic means for automatically receiving, formating, and storing billing data relating to telephone toll calls originated in both local and tributary offices.

The terms CAMA and LAMA are acronyms used in reference to the present invention to denote Centralized Automatic Message Accounting and Local Automatic Message Accounting. By Transverter is meant a device which receives details of a call, converts it to a recording format and then seizes a recorder to record the information.

2. Description of the Prior Art

Prior art toll recorders have been largely electromechanical in nature and have been slow and inefficient. Many of these recorders have depended solely upon mechanically punched tape for records. This is a slow and inefficient process which is not readily adaptable to increases in system requirements. Those recorders employing magnetic tape and using an incremental, or one line at a time, tape recorder effectively have lost the capability of checking the data by full read back. This means that if a line of recorded information is found to be defective there is no way to replace it, since the source data is lost once the data is recorded on the tape.

SUMMARY OF THE INVENTION

It is, therefore, an object of the present invention to provide an improved toll recorder which is faster and more efficient than the recorders disclosed by the prior art.

Further objects include the provision of a toll recorder having the means to check incoming data from a telephone switching system, to change the format of the data for routing, checking and recording purposes, to store this data temporarily until a complete block of data has been assembled, and then to make a permanent record of the assembled data while maintaining the temporary record until the permanent record is verified.

The foregoing objects and others ancillary thereto are preferably accomplished by the present invention through use, largely, of electronic processing means. The invention includes means to receive, translate, format, store and record billing information relating to telephone toll calls. Data is received into the present system in binary form from a telephone switching system having CAMA/LAMA capabilities. Typically, it is received through a translator which is not a part of the present invention. In a preferred embodiment the data is in the form of a binary coded decimal or BCD. Demand signals are also received from the switching system to indicate when chargeable connections are sought, are established and when they terminate.

The received data includes two BCD numbers, a parity bit, and a skip lead bit and is presented in parallel over 10 lines to a format control device where it is scanned 10 bits at a time. The skip lead bit is employed to indicate the absence of data. The demand signals are used in determining the type of control entry to the format control. The type of control entry is indicated to the format control by the lead upon which it is presented, there being three possible types of entry for each call. Initial entry (IE), Answer or Disconnect entry (A/D) and a Minute entry (MIN), the latter for time reference. The number of tries for the entry is indicated (first try or second try). The system is responsive to seven distinct and usable conditions which may occur from the entry types and number of tries. These may be briefly summarized as: (1) IE good, first try; (2) IE bad, first try; (3) IE bad, second try; (4) A/D good, first try; (5) A/D bad, first try; (6) A/D bad, second try; and (7) Minute entry.

The system employs a core memory on which may be gathered data indicating the identification of the calling party, the identification of the called party, duration of the call and any other data necessary for billing purposes. A check is made of the accuracy of the data in the core memory and it is emptied periodically into a tape memory.

BRIEF DESCRIPTION OF THE DRAWINGS

The above mentioned and other features and objects of this invention and the manner of obtaining them will become more apparent, and the invention itself will be best understood by reference to the following description of an embodiment of the invention taken in conjunction with the accompanying drawings, in which.

DESCRIPTION OF PREFERRED EMBODIMENTS

Figure 1:
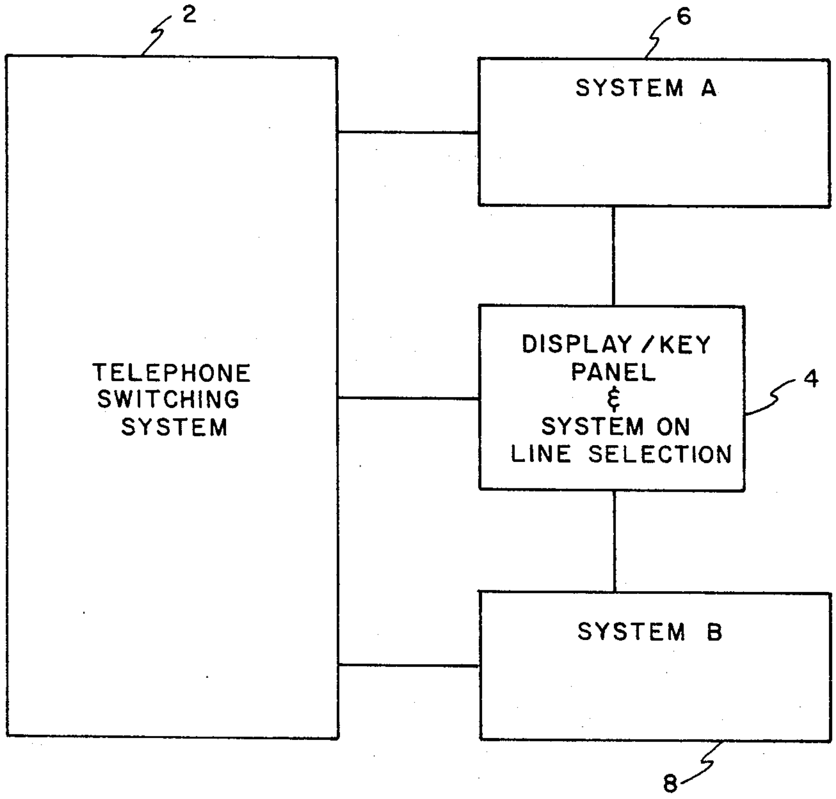
FIG. 1 is a block diagram broadly illustrating the system of the present invention and the way in which it may be interconnected with a telephone switching system.

FIG. 1 is a block diagram depicting the overall relationships of the system to an electromechanical crossbar telephone switching system. The CAMA/LAMA Transverter is designed to work with a common control crossbar telephone system, indicated by block 2 in FIGS. 1 and 2. The system may be employed, however, with other telephone switching systems which are equipped with CAMA/LAMA circuits or other subscriber identification circuits. The transverter portion includes two identical systems referred to herein as the "A" system and the "B" system. A common selector, or Panel at 4, is used to determine whether the "A" or "B" system is in use, or "on line."

The Display/Key panel and System on Line Selector 4, referred to as the Panel, controls the on line function by causing all inputs to be gated to a particular system, i.e., to system A or to system B. It also provides a display of various conditions of the "off line" system and facilities to input data and certain commands to the off line system. The reason for the off line functions of the panel is to prevent accidental destruction of stored data in the on line system.

The on line system will receive, check and store BCD data and will stay on line until one of two conditions occurs These conditions are: (1) an alarm in the on line system or (2) a manual change from one system to another. Once one of these conditions occurs, the systems will reverse, the on line system going off line and the off line system going on line.

By way of example, assume the A system represented by block 6 in FIG. 1 is on line and the B system (block 8) is off line. The panel will cause all inputs from the telephone system to be gated to the "A" system. The "A" system will receive and check the data. The result of this check determines whether or not the data should be stored or rejected and sent back to the telephone system to be processed by the operator. If at any time, either while waiting for data or while receiving data, any of the system alarms occur the Panel will, after allowing time for an entry in progress to finish, cause the "A" system to go off line and the "B" system to go on line. It will also indicate the type alarm on the panel display lamps. The A system can not then be put back on line until all alarms are cleared and it is manually selected or automatically selected due to an alarm in the "B" system.

BLOCK DIAGRAMS OF THE SYSTEMS

Figure 2:
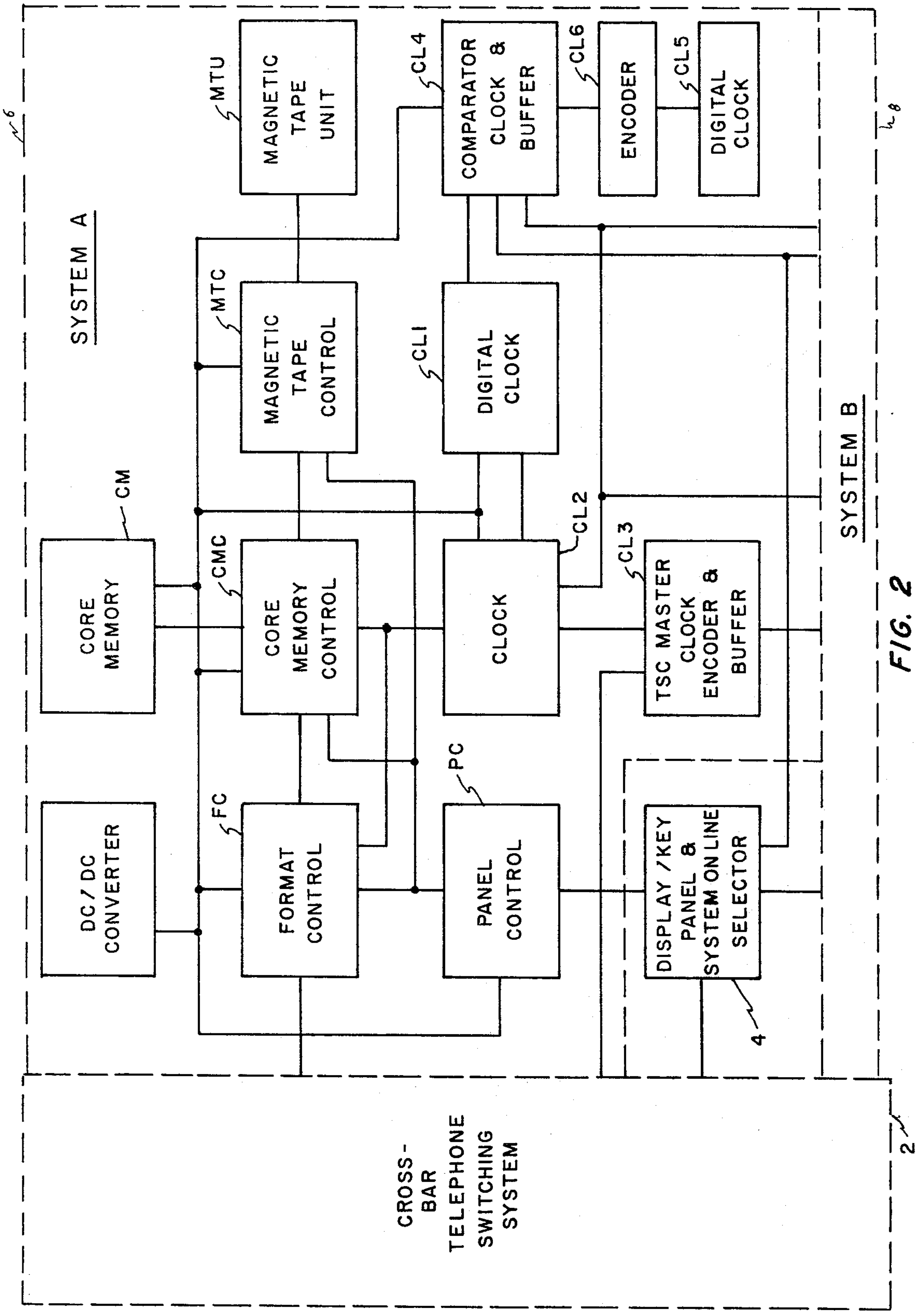
FIG. 2 is a block diagram illustrating in greater detail interrelationships between the present invention and a telephone switching system.

FIG. 2 is a block diagram showing further details of the arrangement of FIG. 1. As can be seen, one of two identical systems (system A) is shown in detail with a common Display/Key Panel & On Line Selector 4, hereinafter referred to as the Panel. The following general description pertains to either of the two systems, A or B.

The Panel 4 will determine which of the two systems is to be on line and cause all data to be gated to the selected on line system. The demand from the telephone system 2 indicating the presence of data is received by the Format Control FC. If the Core Memory Control CMC is not busy the demand is acknowledged. In the event the Core Memory Control is busy the demand is held until it can be processed or the circuit times out, drops off for a second trial, or for operator handling. The demand is delayed to allow for relay bounce to settle. The data is then checked for correct parity in the Format Control. If all data is correct, it is loaded into a Core Memory CM by the Core Control. If a failure occurs, certain steps are taken depending on entry type, whether it is the first or second trail, and the location of failure. In preferred embodiments commercially available core memories have been adapted to use in this system.

The data is temporarily stored in the Core Memory CM. Once the data is stored correctly, the demand is removed by a release signal to the telephone system. The Core Memory Control continues to store entries in the Core Memory until it contains a block of data. When the Core Memory contains a full block of data, the Core Memory Control will signal the Magnetic Tape Control MTC to start the Magnetic tape unit MTU and busy itself to any other entries. When the tape unit is ready to record, the data is clocked out of the Core Memory CM through the Core Memory Control CMC and the Magnetic Tape control MTC and finally onto the magnetic tape. When the Core Control has allowed all data to be transferred to tape, a signal is passed to the Magnetic Tape Control MTC to stop the tape unit. If any errors were detected while writing the data onto the tape, the Core Control stays busy and tries to transfer the data again; if no errors were detected, the Core Busy signal is removed and the Core Control is ready to receive another demand.

All time information required in the data processing is derived from a commercially available Digital Clock CL1 and from the Master Clock Encoder CL2 in the respective A or B systems. The Encoder CL2 also transfers the time from the digital clock through the TSC Master Clock Buffer CL3 to operator positions coupled to the telephone switching system. The choice of which Master Clock Encoder and TSC Master Clock Buffer to use is determined by the Panel 4. As a result, the operator always has the time being used by the on line system.

The clocks are kept in a specified tolerance by the Comparator Clock CL4. If any of the three digital clocks drift out of the specified tolerance, an alarm is generated for the system containing the incorrect clock.

The Panel Control PC transmits data to display lamps or generates commands, on a manual signal, which are gated to the various parts of the off line system. The signal indicating the on and off line system is received from the Display/Key panel and System On Line Selector, or Panel, 4.

The Magnetic Tape Control serves as an interface between the magnetic tape unit and the core control. In this way the Transverter can work with either 7 track or 9 track tape units, which are commercially available, at any standard or non-standard density or transfer rate after only minor changes in this one circuit.

DESCRIPTION OF THE FORMAT CONTROL

Figure 3:
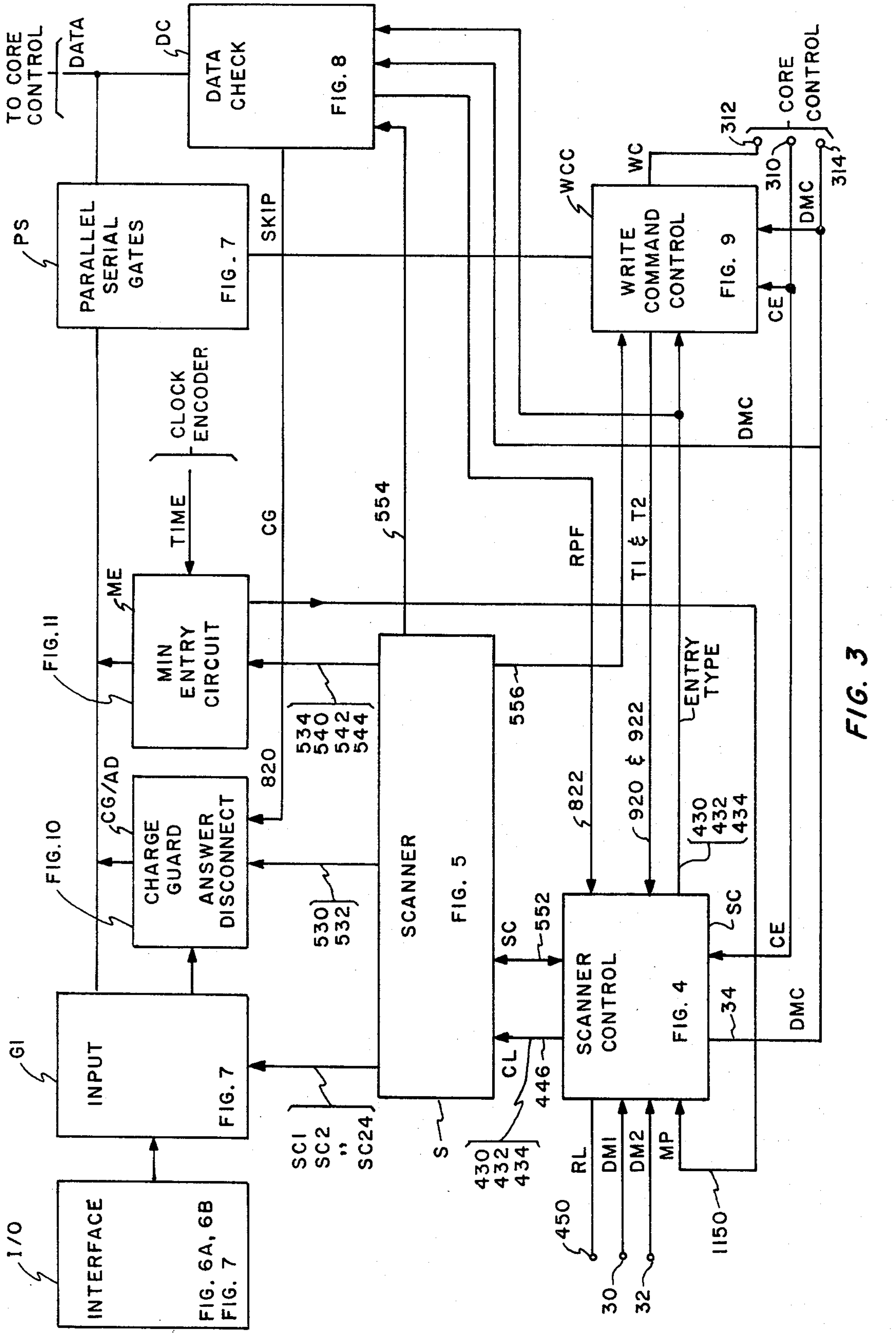
FIG. 3 is a block diagram showing further details of the format control (FC in FIG. 2)

FIG. 3 is a block diagram of the Format Control showing further details of the system indicated by block FC in FIG. 2. Each of the blocks in FIG. 3 is identified by function and by a Figure number. Each Figure number designates a drawing containing a more detailed disclosure of circuits which provide the designated function.

Figure 10:
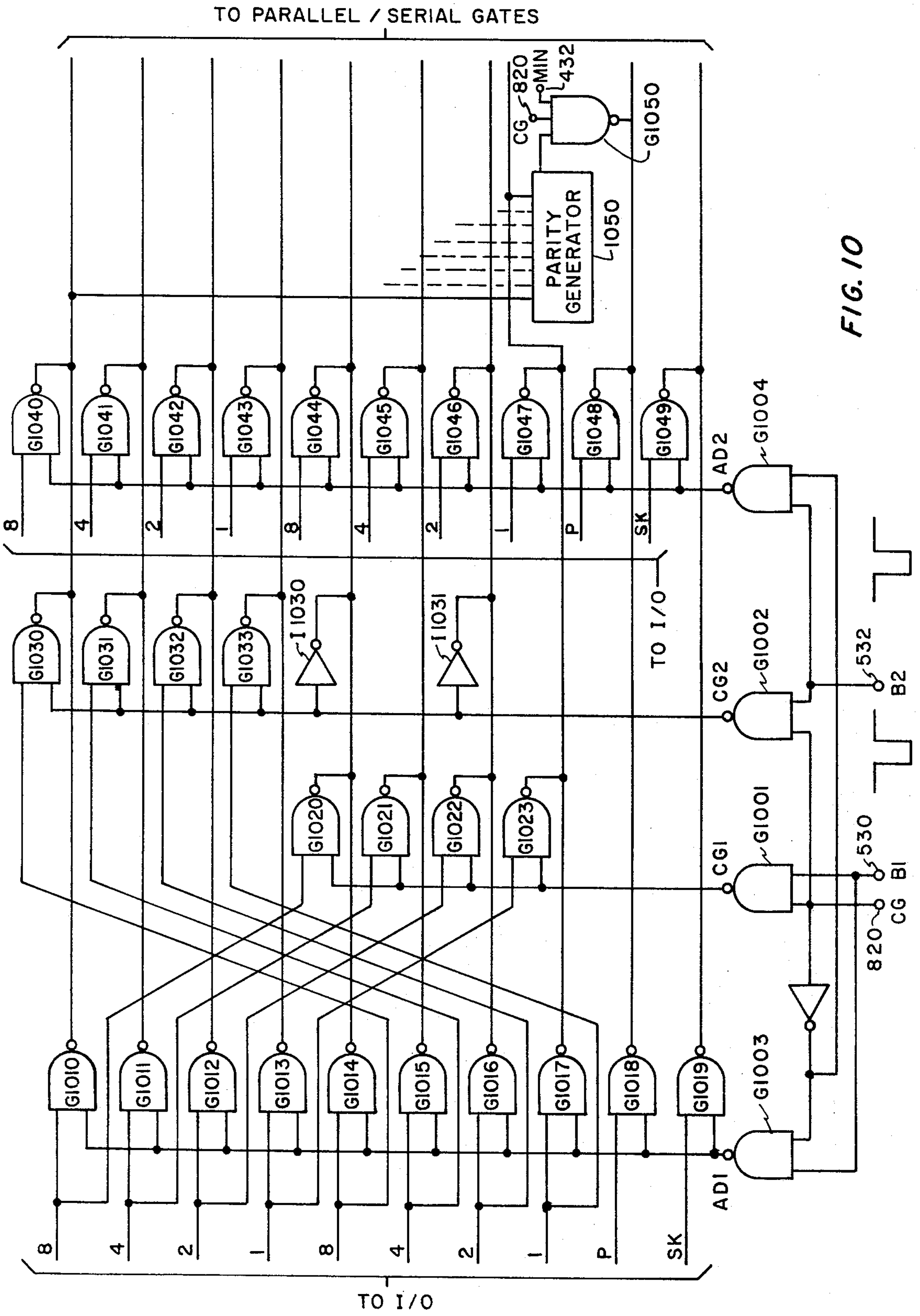
FIG. 10 shows an arrangement of gate circuits of use in providing charge guard and answer/disconnect functions (CG/AD in FIG. 3)
Figure 11:
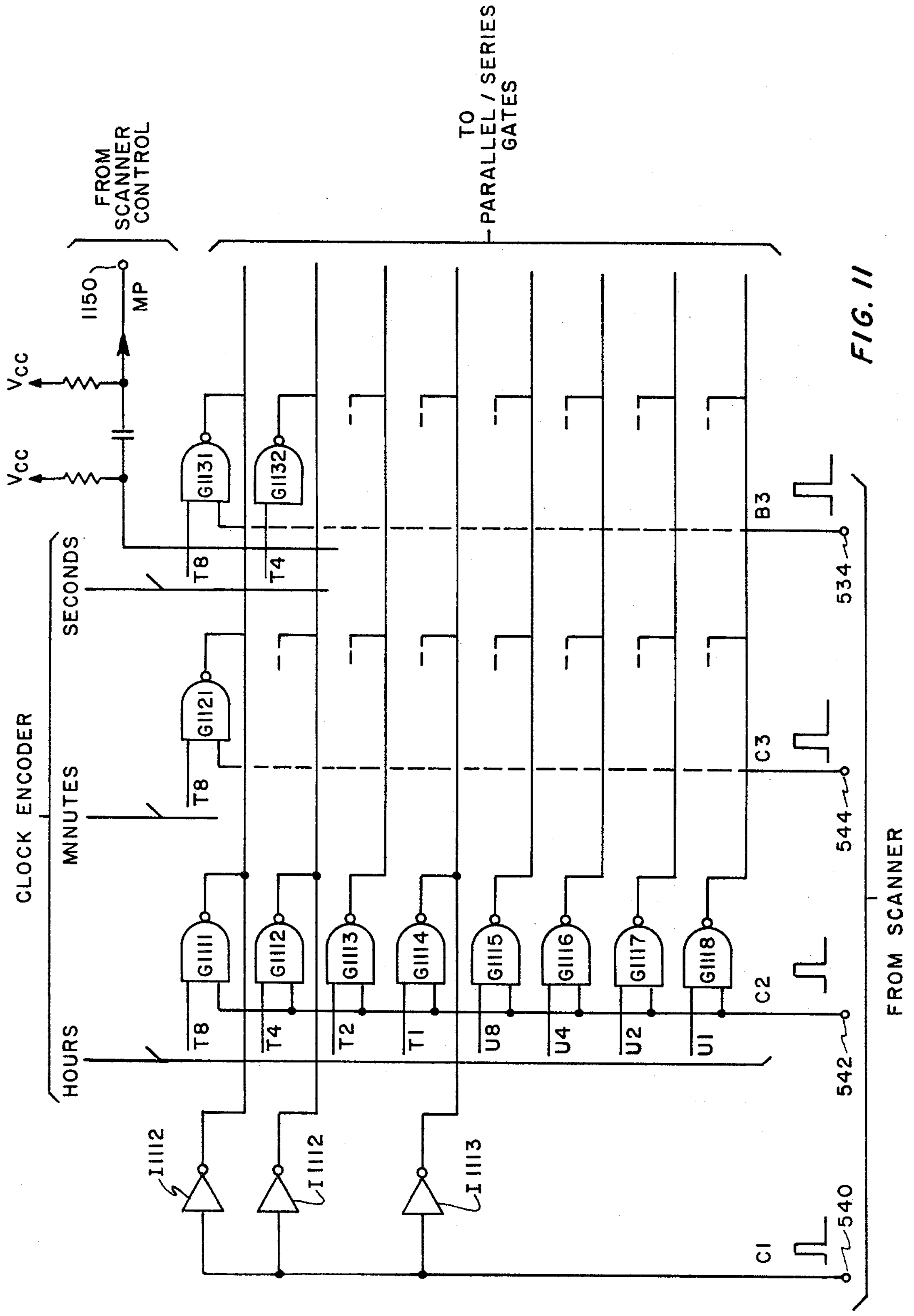
FIG. 11 shows a circuit for production of the minute entries (ME in FIG. 3)

A demand of one of 3 types may be made on the scanner control, SC, over terminals 30, 32 or 1150 in FIG. 3. If the core memory control (CMC in FIG. 2) is not busy, the scanner control through the scanner S (in FIG. 3) will scan the data from ten interface elements I/00, I/01. . . .I/09 (each corresponding to I/0 in FIG. 6A) through the input gates GI (FIG. 7). If the core control is busy, the Format Control waits. Other entry types may be scanned in from the Minute Entry Circuits ME (FIG. 11) or the Charge Guard/Answer Disconnect circuit CG/AD (FIG. 10). The data is scanned once; and by going from a group of words in parallel to one word at a time in the Parallel/Serial Gates PS (FIG. 7), the parity can be checked on each word.

Figure 8:
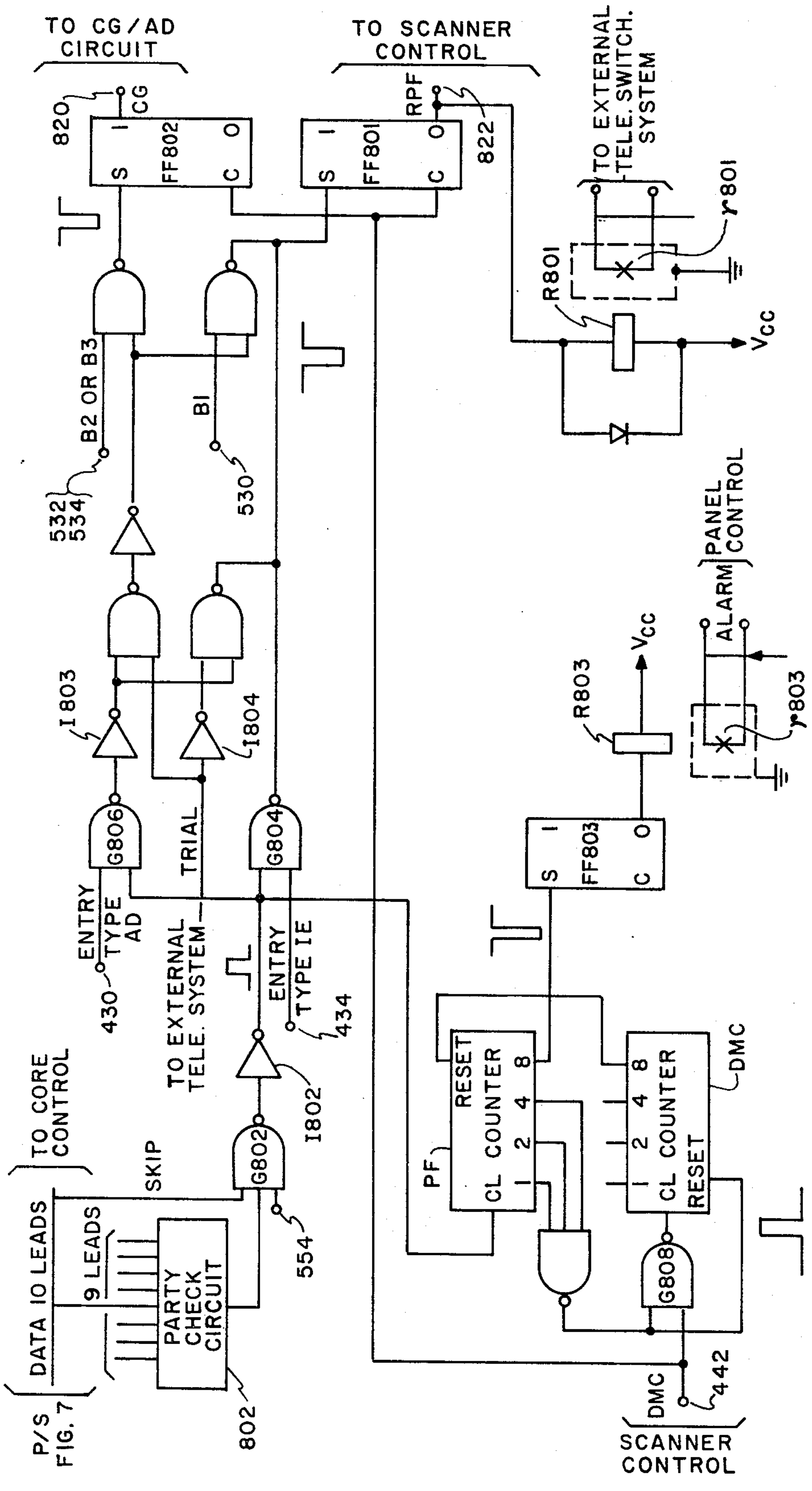
FIG. 8 is a diagram showing an arrangement of logic circuits for checking data (DC in FIG. 3)

If there are no errors, the data is scanned a second time; however, this time the write command control WCC writes each word into a core memory. If errors are encountered, the Data Check circuit DC of FIG. 3 (shown in detail in FIG. 8) will take appropriate steps depending on entry type, location of error in the data (first word, second word, etc.), and whether the first or second trial is involved. Upon completion of the second scan a release signal is returned to the circuit originating the demand. After the release signal is sent out, and the demand is removed; the circuits are reset to accept another demand.

SCANNER CONTROL

Figure 4:
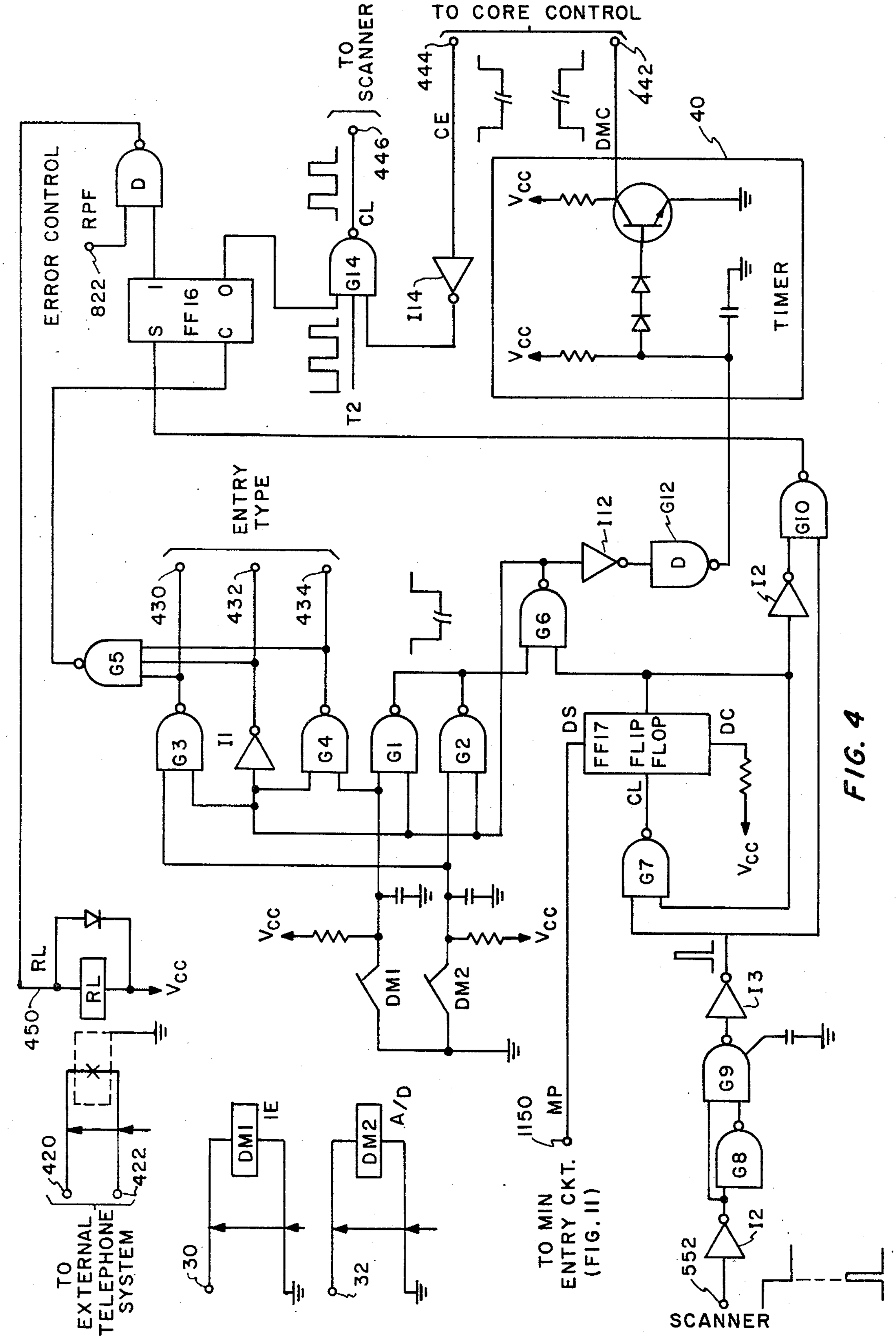
FIG. 4 is a block diagram showing the organization of the scanner control (SC in FIG. 3)

The Scanner Control is shown in detail in FIG. 4.

There are three basic types of entries which are used in this system, they are: Initial (IE), Answer/Disconnect (A/D) and Minute (MIN). The first type to be discussed will be the IE. Other types are discussed later in the disclosure. The initial entry is made at the beginning of a toll call. It is associated with all the pertinent information needed for billing the call once it has been completed, except its duration. The entry is made via the DM1 relay (FIG. 4) which is operated over terminal 30 by the telephone switching system. The DM1 and the DM2 relays may preferably be mercury relays. If no other entry is in progress, the output of G6 is high, both inputs of G1 are high, and the output will go low. This will produce a signal through an inverter I12 and gate G12 to cause the DMC lead at 442 to go low after a delay set by the timer 40. The delay allows time for all relay bounce to settle out of the interface data cards. When the CE lead 444 from the core control goes low, clock pulses CL are gated to the scanner over the gates I14 and G14 and terminal 446. The entry type is also made available at gates G3, G4 and I1 over terminals 430, 432 and 434.

THE SCANNER

Figure 5:
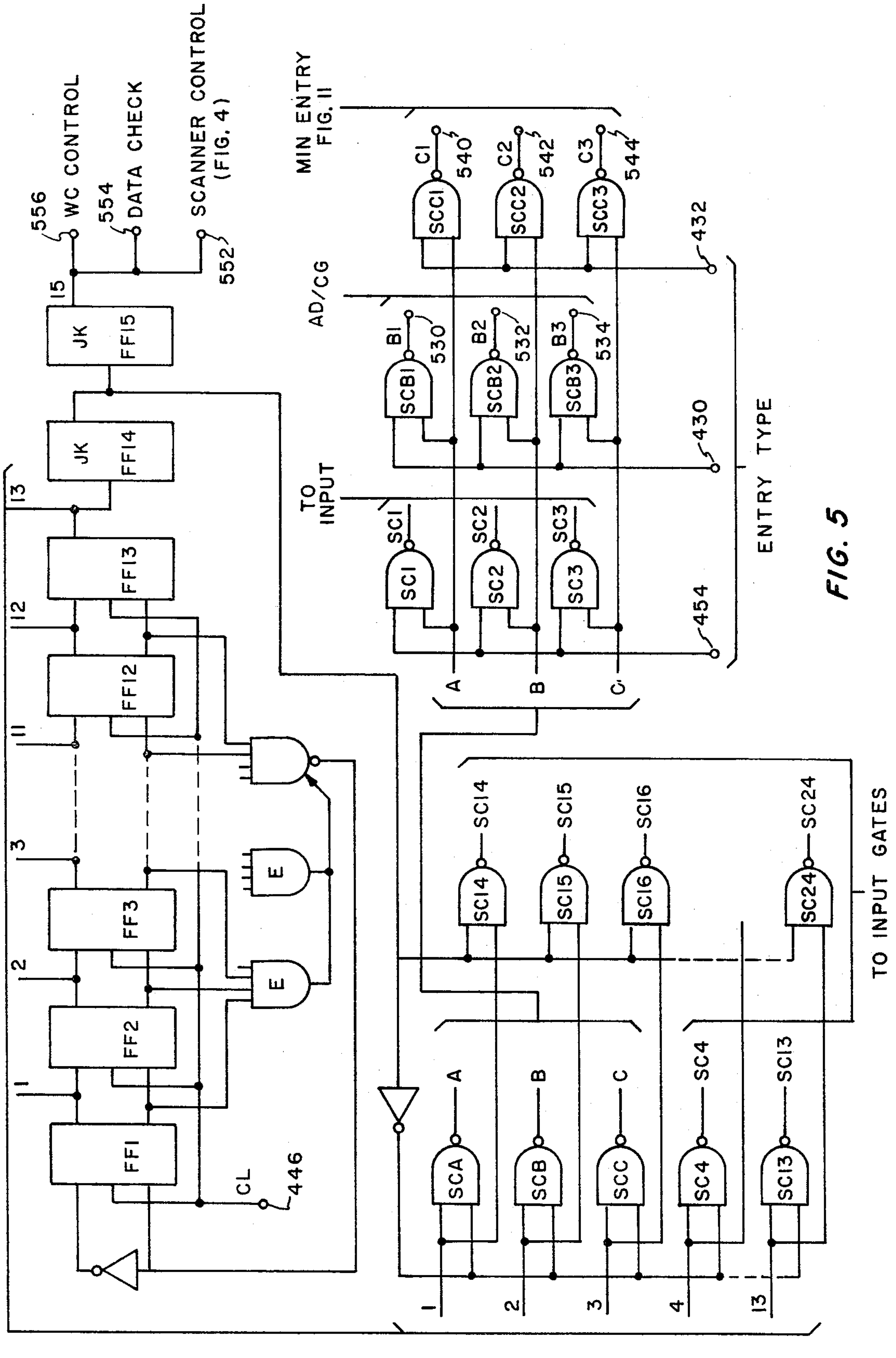
FIG. 5 is a block diagram showing an embodiment of the scanner (S in FIG. 3)

The scanner, shown in detail in FIG. 5, receives the clock pulses CL over terminal 446 from FIG. 4. Each pulse advances a "high" level down the 13 flip-flops, FF1, FF2 . . . FF13 placing the output on scanner gates SC-1 through SC-13 (one at a time). The 14th pulse will set the flip-flop FF14 and restart the flip-flop chain, only this time the outputs will appear on scanner gates SC-14 through SC-24. When FF-15 is set, the second scan has started. The same outputs appear over SC-1 through SC-24 and the flip-flop FF 15 will reset, setting FF16 (FIG. 4) over terminal 552 and through the pulsing circuit G8, G9, I3 and the gate G10. This will inhibit the clock pulses over G14 and terminal 446 to the scanner and put out a release signal to the electromechanical system. The outputs of gates SC 1-SC 20 are employed to energize data gates, as shown in FIG. 7 and elsewhere. Gate SC21 serves as a stop gate. Gates SC 22– SC 24 are not used in present embodiments, but are made available for future use with international numbering systems or other expansion purposes.

INPUT/OUTPUT INTERFACE

Figure 6A:
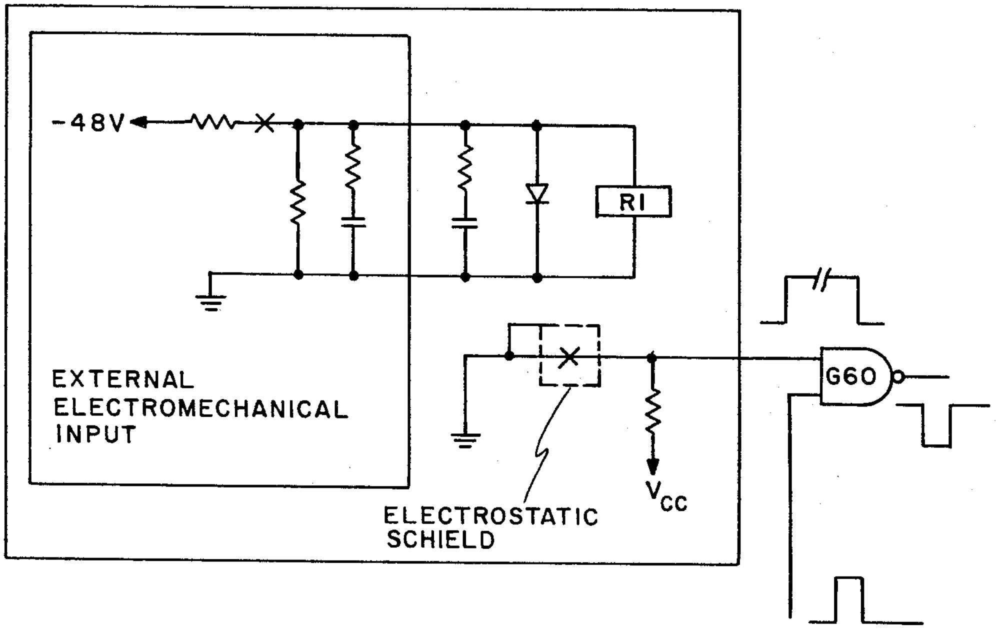
FIGS. 6A and 6B show typical examples of arrangements for interfacing between an electro-mechanical switching system and an embodiment of the present invention (I/O in FIG. 3)
Figure 6B:
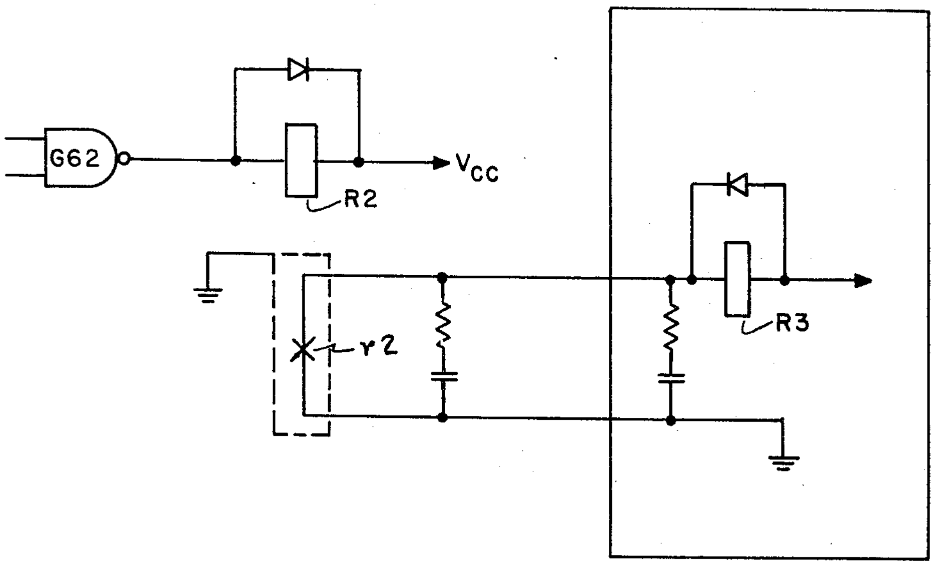
Figure 7:
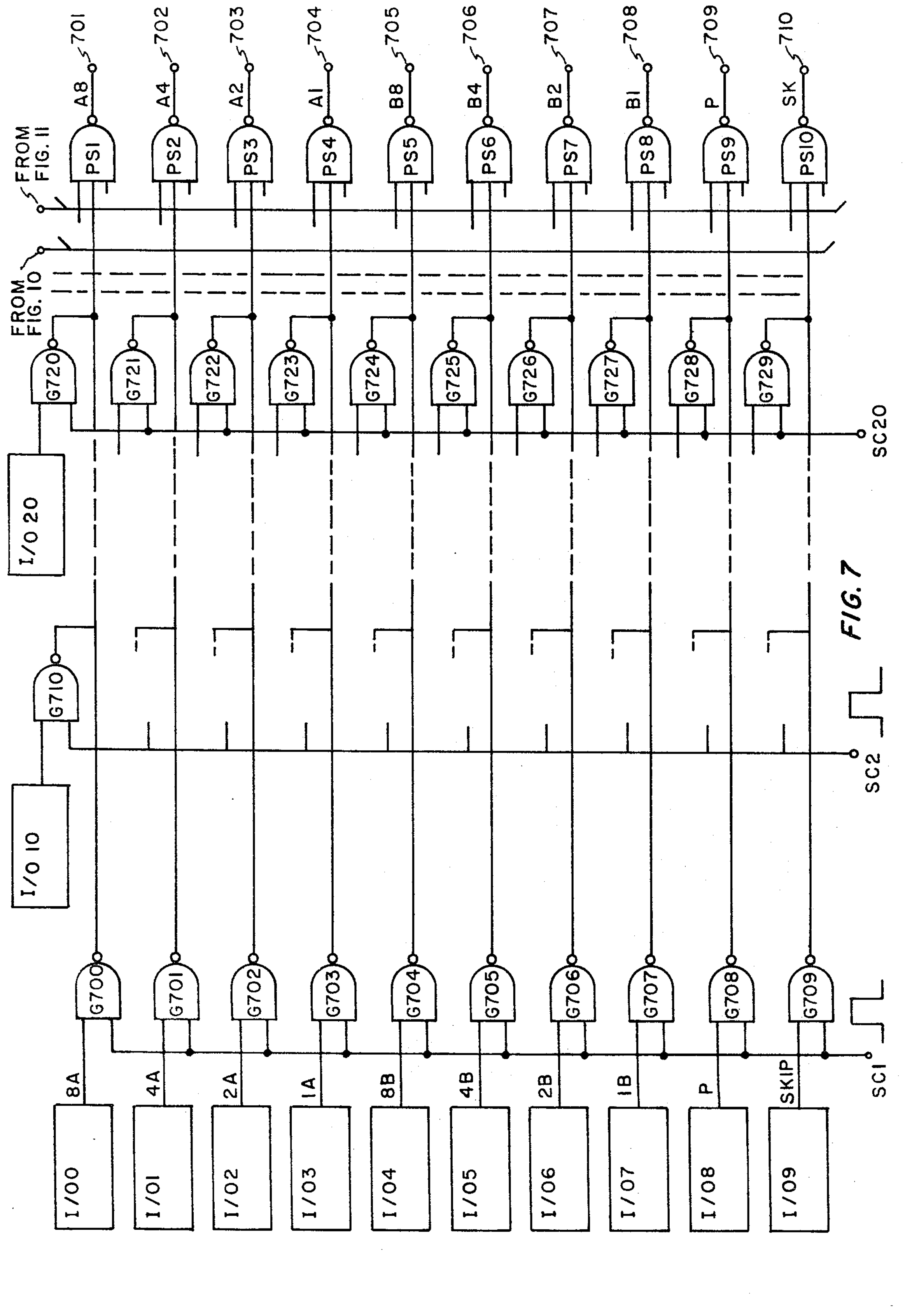
FIG. 7 illustrates an arrangement of input gates coupled for scanning between parallel series gates and interface elements (I/O & G1 FIG. 3)

FIG. 6A illustrates a typical Input/Output interface (I/O) from the electromechanical to the electronic system. Reed relay R-1 of FIG. 6A is operated from an external source which may be electronically noisy. The contat is electrostatically shielded from the coil and protects against induced noise spikes. Closure of the relay contact will gate G60 "on" to transmit a pulse, as indicated in the diagram. This circuit is used on all I/O inputs from the telephone switching system, as indicated by I/O blocks in FIG. 3 and FIG. 7. An electromechanical to electronic component for the interfaces I/O is shown in FIG. 6B. In this instance, energization of a gate G62, by means not shown, will activate a relay R2. Relay R2 will then provide energy to operate other relays, such as R3.

DATA INPUT GATE CIRCUITS

Outputs of the scanner gates, SC-1 through SC-20 (FIG.5) enable each of the groups of inputs in FIG. 7. As each group of gates is enabled the data on the interface is transferred onto the output bus. Since the bus is normally at a high potential, a high on the interface and the enable lead high will cause the bus to go low. The Parallel/Series (PS) Gates PS-1 through PS-10 have their inputs connected to the buses. The outputs of the PS Gates are normally low since the bus inputs are all normally high. Any data causing a bus to go low will cause a change on the output of its particular PS gate. For example, a high on the input of gate G701 will cause the associated bus to go low when the gate is enabled. When the bus goes low this causes an input of gate PS-2 to go low thus causing the output to go high. By enabling 10 gates at a time 24 ten-bit words can be checked and stored sequentially.

DATA CHECK CIRCUIT

As each word is enabled it has its parity bit checked (FIG. 8) by a conventional parity check circuit at 802. The result of the parity check is gated with the scanner location to inhibit the parity check during the second scan of the data. A skip lead is also gated with the results of the check. This enables the external data source to mark unused data that need not be checked.

If an error is detected and gated through G 802 and I 802, it then passes through G 804 since this is an IE. This negative pulse sets FF 801 which operates the reed relay R 801 and extends a release signal to the external electromechanical system and also inhibits the normal release (FIG. 4) over the RPF lead 822. The parity failures are also counted and compared with the number of demands. The DMC counter is inhibited until a single parity failure is encountered. When a failure is found the PF counter will enable gate G 808. If a ratio of failures to demands is exceeded an alarm is set over FF 803 and contacts of relay R 803. This will cause the systems A and B, as shwon in FIG. 1, to interchange. The method by which this change is made will be discussed later.

WRITE COMMAND CONTROL

Figure 9:
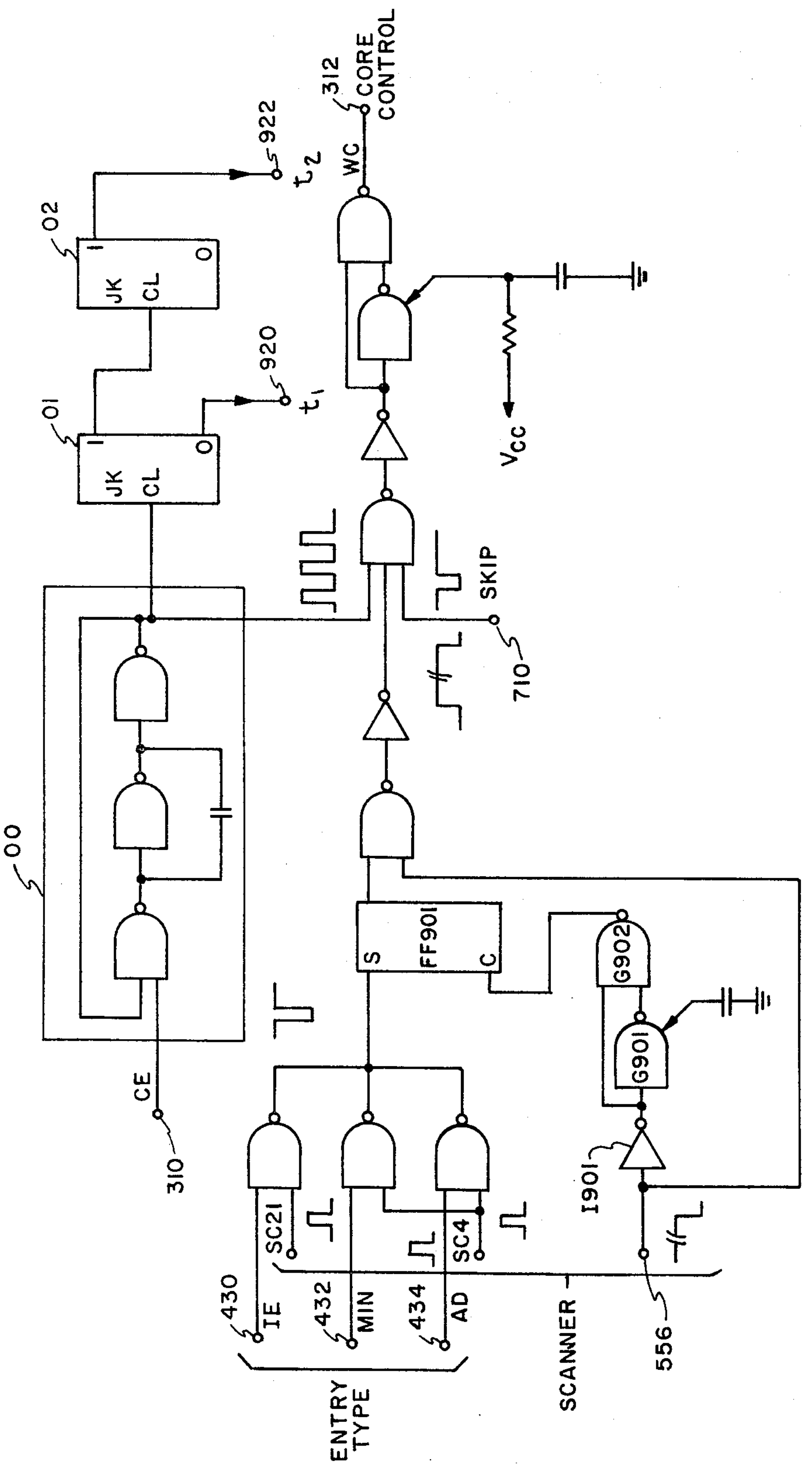
FIG. 9 is a diagram showing an arrangement of circuits to enable control elements of the format control system (WCC in FIG. 3)

On the second scan, if there were no parity failures on the first, the Write Command Control Wcc is enabled (FIG. 3, shown in detail in FIG. 9) when the CE signal (a signal indicating the magnetic cores are available to receive signals) is returned from the Core Control. The oscillator 00 drives flip-flops 01 and 02 to generate 2 sets of clock pulses *t*-1 and *t*-2. These clock pulses are used to advance the scanner on the first and second scan. The WCC is controlled by Entry type and scanner location. For a particular entry type a certain number of pulses are required to store its data. When this many Write Command or WC pulses have been generated, FF 901 is set which inhibits the WC output. The scanner then finishes its scan and through I 901, G 901, G 902, resets flip-flop FF 901. The skip signal is used to avoid WC's for unnecessary data.

When the scan is finished and at the same time as FF 901 is being reset, the release FF (FF 16 in FIG. 4) is set by a pulse through G-10. This FF will operate the RL reed relay and extend a release signal over terminals 420, 422 to the external electromechanical system. The FF 16 will be reset and the reed released by G-5 when the demand is removed and there is no entry type present.

CHARGE GUARD AND ANSWER/DISCONNECT CIRCUITS

The Answer/Disconnect Entry (A/D) of FIG. 10 appears at the answer and at the disconnect of a toll call. The answer and disconnect entries contain a trunk identity and the time in seconds. The trunk identity also appears in the IE and is used to link the three entries necessary to bill a call, although they appear at different locations on the final tape.

The demand is acknowledged in the scanner control SC (FIG. 4) the same as the IE. The scanner (FIG. 5) output, however, is slightly different. Outputs appear at B-1 through B-3 and SC-4 through SC-24. The outputs B-1 and B-2 enable the inputs of gates G1001, G1002, G1003, and G1004 which control additional gates shown as G1010-G1049 in FIG. 10. The outputs of these gates are applied to and pass through the P/S gates on a bus as did the IE data. The data is checked as was the IE data, and if there are no errors the data is stored in a core memory and a release occurs the same way as with the IE. However, if an error occurs the action taken depends on several conditions:

1. An error on the first trial is handled as with an IE failure.
2. An error on the second trial on the first word is handled like (1).
3. An error on the second trial on the second word sets the FF 802 in FIG. 8. The resulting potential at 820 has been called to Charge Guard (CG) and is used in the control of the CC/AD circuits of FIG. 10.

The Charge Guard CG can be used to bill a call if a bad trunk is found in the group contained in the CG. When the CG flip-flop is set the two gates (G1001 and G1002) are enabled in FIG. 10 and gate 1004 is inhibited. The scanner outputs B-1 and B-2 enable the CG-1 and CG-2 leads on the second scan which generates a CG containing only the corrected part of the A/D. The parity generator 1050 in FIG. 10 generates a parity bit via G 1050 for the CG. Its data is transferred through the P/S gates and written into a core memory just as is the correct A/D or IE. The release signal to the electromechanical system occurs the same as with any other correct entry.

MINUTE ENTRY CIRCUITS

The last entry type is the Minute Entry. It is originated by the Minute Entry circuit shown in FIG. 11. This entry includes hour and minute entries and is entered every minute. It is started by a negative pulse on the MP lead which is provided to FF 17 in FIG. 4. If there is no external demand the inputs are inhibited and a demand is made to the core control (DMC). The scanner outputs are the same except for the first three outputs C1, C2 and C3 which now occur at terminals 540, 542 and 544 of FIG. 5. These outputs enable the corresponding three leads marked 540, 542 and 544 in FIG. 11. This identifies the entry as a Minute Entry and enables the hours and minutes. (The seconds, B-3, are enabled on a terminal 534 from the AD circuit of FIG. 5). The data appears on the bus to the P/S gates and obtains a parity bit from the parity generator in FIG. 10. The scanner itself functions the same as with other entry types. The Write Command Control WC of FIG. 9 writes the correct amount of data into core just as it did for the IE and Ad or CG. Upon completion of the second scan the release pulse is gated to FF 17 (FIG. 4) and removes the Minute Entry demand. The release flip-flop, FF 16, was not set due to G-10 being inhibited by FF 17 and I-2.

TSC MASTER CLOCK ENCODER

A TSC Master Clock Encoder CL3 (FIG. 2 and FIG. 12) is used as a buffer and isolation device between the respective Master Clock Encoder CL2 "A" or CL2 "B" of the A and B systems and external circuits.

Figure 12:
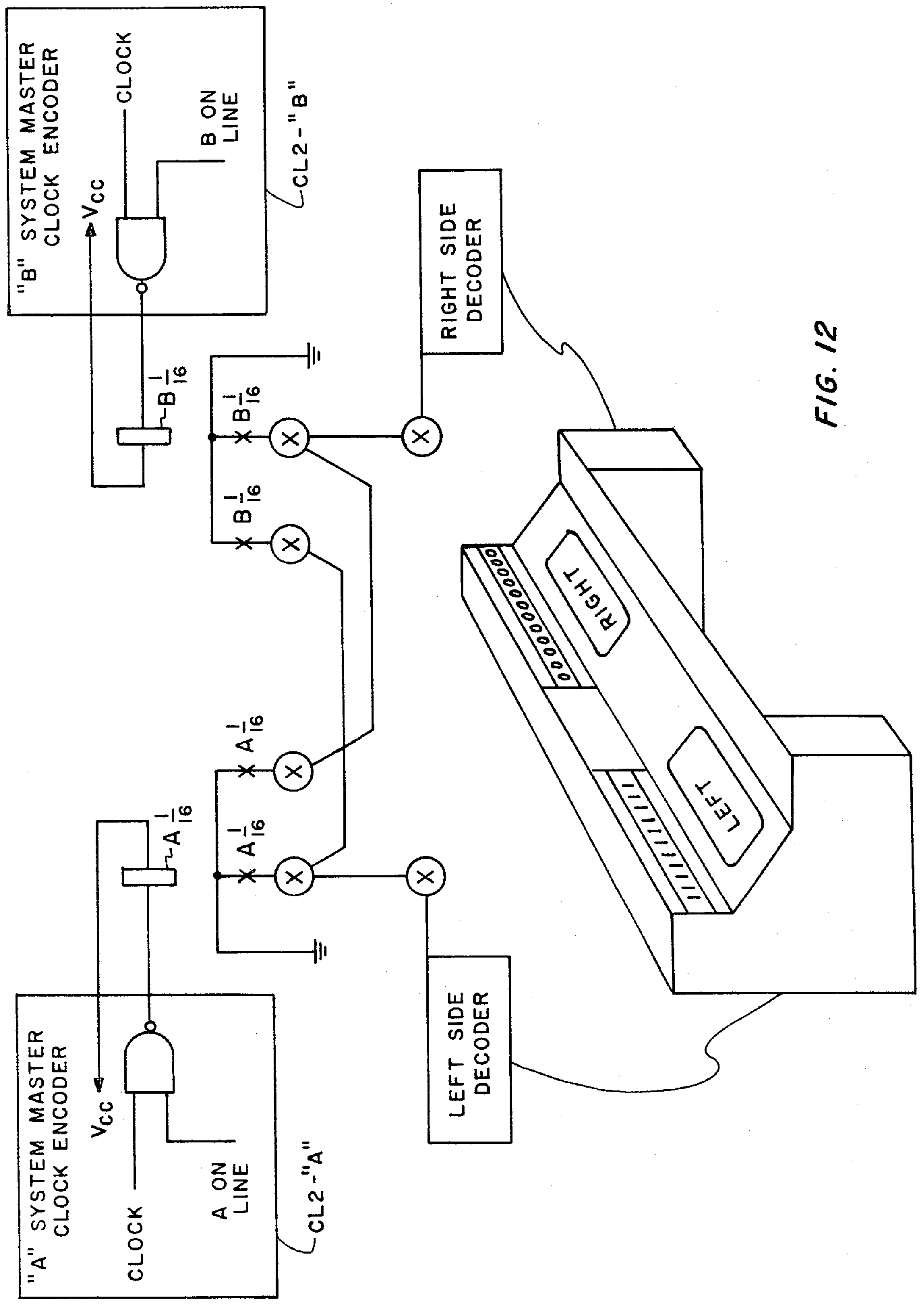
FIG. 12 depicts an operators' console and also a diagram of master clock encoders of use in the invention.

A binary output from a system "A" or system "B" Master Clock Encoder, FIG. 12, drives its associated relays in the sixteen relays A1/16 or B1/16 in the associated TSC Master Clock Encoder CL3. As they operate, a ground is extendended on two separate leads going to an external decoding circuit which is used for decoding BCD to the code of a particular display (NIXIES in a particular case). Each of these coding circuits drives one side of the operator's console display. In this way if one fails the other side will display correctly.

Only the On Line Systems Clock Encoder will operate its relays so the ON Line System time will always be displayed on the console. Relays are used for this function to provide isolation between both systems. In this way, the power supplies of each system are isolated. This would not be the case is solid state gates were used, since they would be common to both systems.

COMPARATOR CLOCK

Figure 13:
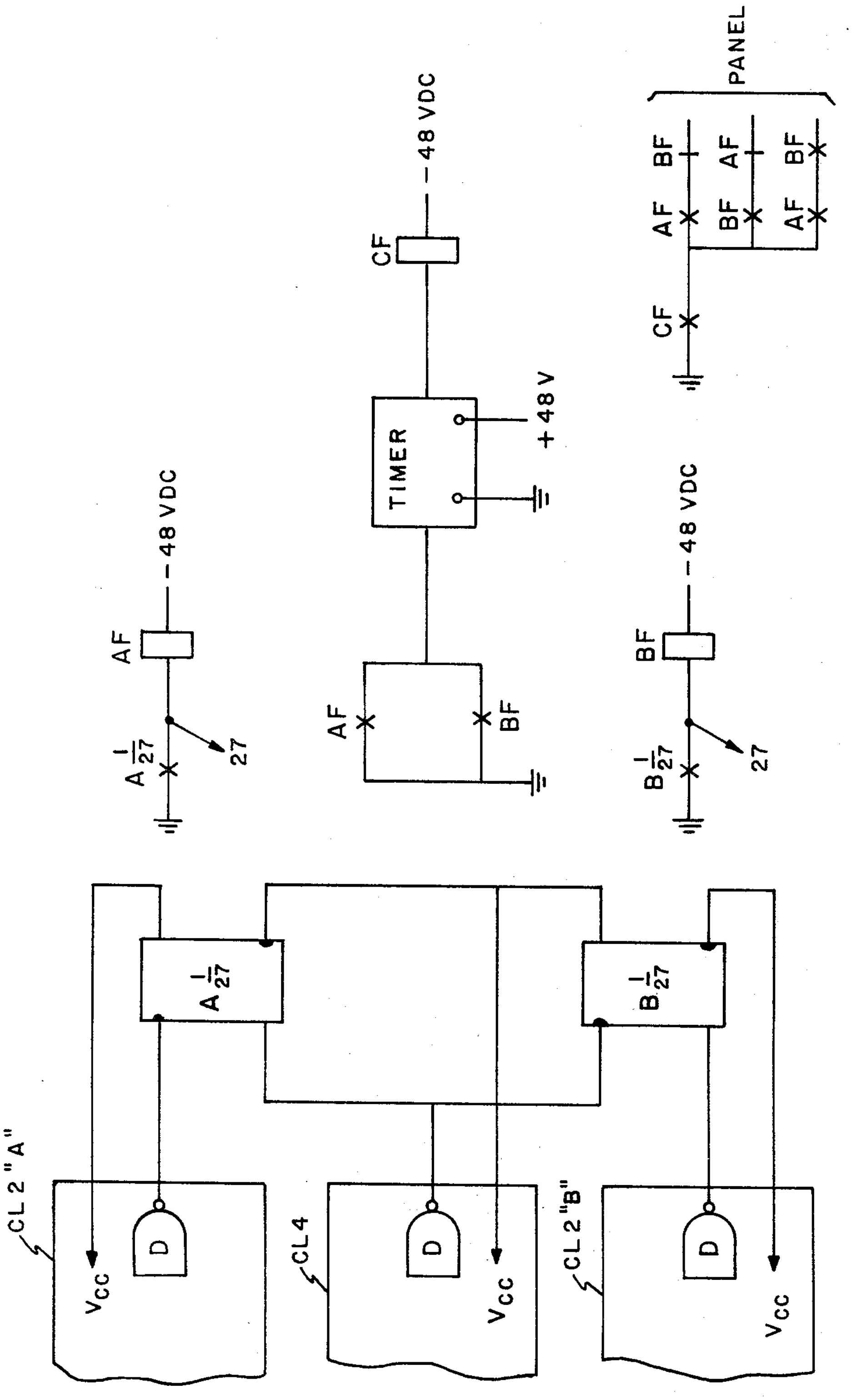
FIG. 13 shows the manner of connection of the master clock encoders of the A and B systems for comparison.

The block diagram of FIG. 13 provides further details concerning the construction and functions of the Comparator Clock Buffer shown at CL4 in the system block diagram of FIG. 2.

The output of a Digital Calendar Clock is encoded CL5, CL6 (FIG. 2) and used to generate a third time source from the Comparator Clock CL4. With three time sources, A system, B System, and Comparator, a comparison can be made and if an error is detected a "2 out of 3" vote will determine which clock is at fault. If the fault is found to be in the clock of the ON line system the systems are changed and cannot be changed back until the clock is corrected. If, however, the fault is in the OFF line system a system change is prevented, manually or automatically, until the fault is cleared. An error in the Comparator clock will not effect either system. An alarm is turned on if any of the above described conditions occur.

More specifically, the outputs from the Master Clock Encoders of the A and B systems are connected to one side of a relay with two sets of windings, as shown in FIG. 13. As can be seen, the output of the Comparator Clock is connected to the other winding of the relays so that the current from each source is in opposite directions in the relay. As long as both sources supply current the relay will not operate. However, if one source fails there is no opposing current and the relay operates.

If any A or B relay (FIG. 13) operates it will operate an AF or BF relay which will start a timer. If the timer "times out" the CF relay will operate and signal the key and display panel which clock is incorrect.

If, for example, the A system clock is not the same as the comparator clock or the B system clock, one of the twenty seven A relays will operate and cause AF to operate starting the timer. If the A relay is not released during a period determined by the timer the CF relay will operate and signal the panel of the error. The panel will take the appropriate action depending on which is the ON line system.

Figure 14:
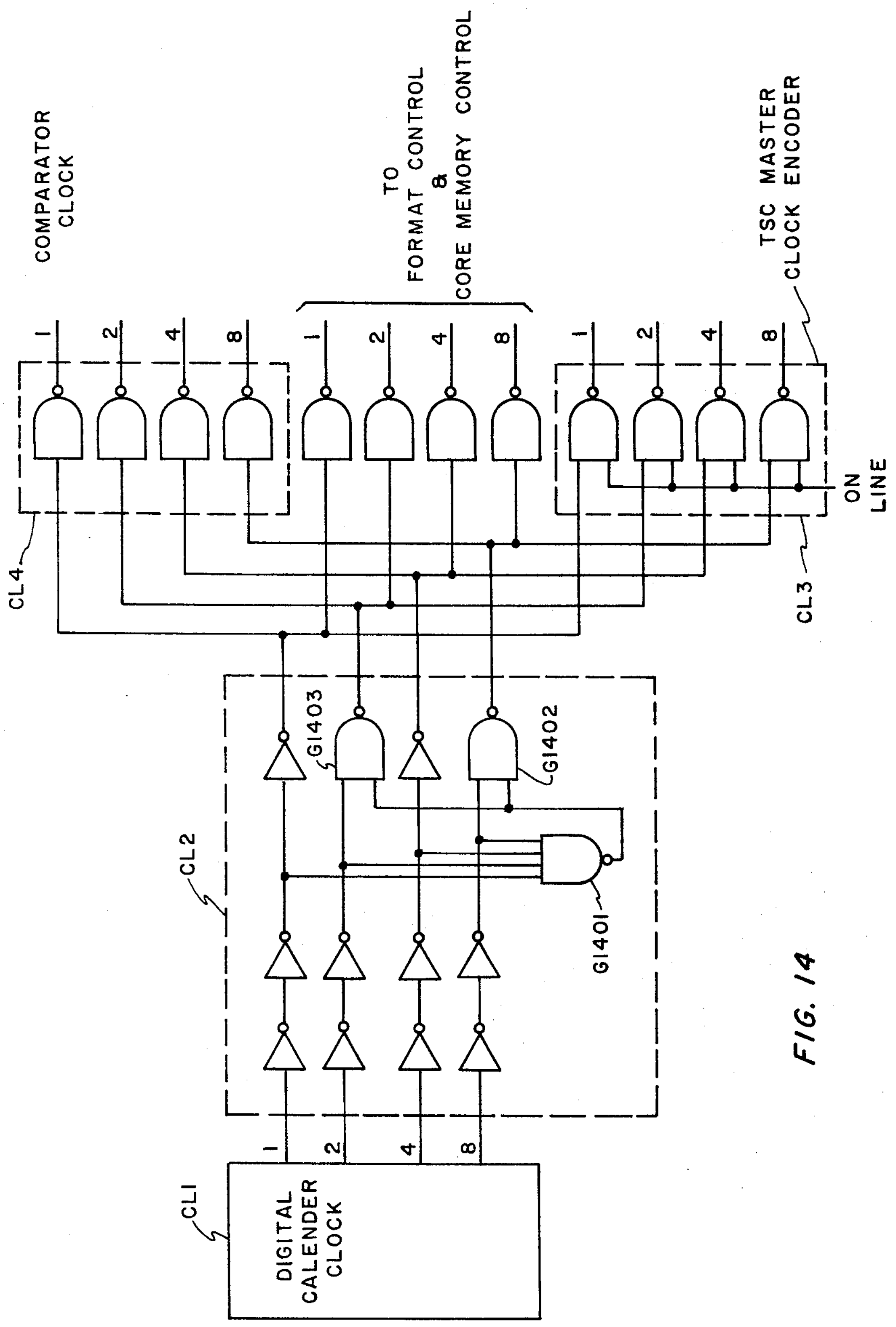
FIG. 14 is a block diagram showing further relationships of the clock systems employed in the practice of this invention.

The Master Clock Encoder (CL2 — FIG. 2), shown in further detail in FIG. 14, receives the time from a digital calendar clock CL 1 in Binary Coded Decimal. The Encoder converts part of the information to a different Binary coding. The output from the encoder is then buffered for each of the three outputs from the Master Clock Encoder.

The months (10's and units), days (10's and units) hours (10's and units), minutes (10's and units), and seconds (10's and units) are presented to an encoder circuit CL 2, shown in FIG. 14. The BCD code from the clock has to have the code for zero changed. The change is shown in the table below.

| Into Encoder (Low = 1) | 8 | 4 | 2 | 1 | Out of Encoder (High = 1) 8 | 4 | 2 | 1 |
|---|---|---|---|---|---|---|---|---|
| 0 | 0 | 0 | 0 | 0 | 1 | o | 1 | 0 |
| 1 | 0 | 0 | 0 | 1 | 0 | 0 | 0 | 1 |
| 2 | 0 | 0 | 1 | 0 | 0 | 0 | 1 | 0 |

Along with this code change the logic "1" level is changed. The Encoder operation can best be described by an example: Assume all clock outputs from CL 1 are high (zero). This makes all inputs to G1401 high thus its output goes low causing the outputs of G1402 and G1403 to go high. This generates the new code for zero, shown in the table above. Each of the three outputs from the encoder are buffered to provide isolation from the other two outputs. The buffer to the TSC Master Clock Encoder CL3 is controlled by the ON line signal from the key and display panel. The reason for this is described elsewhere in this disclosure.

MAGNETIC TAPE CONTROL

The Magnetic Tape Control acts as an interface between the Core Control and a Digital Magnetic Tape Unit. The Tape Control also provides an option for using 7 Track or 9 Track tape at any density or transfer rate.

Figure 15:
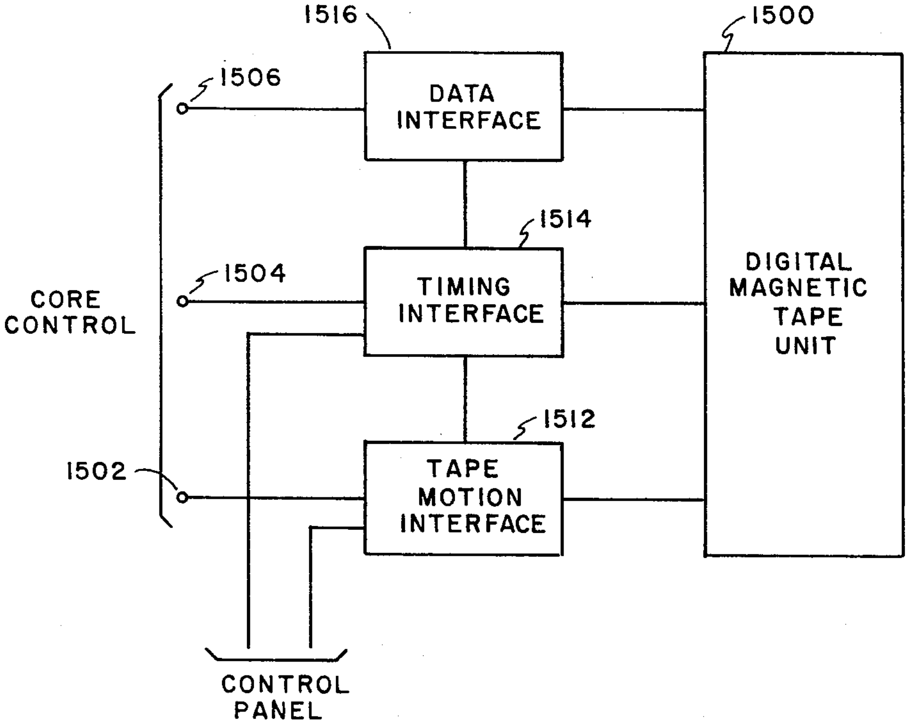
FIG. 15 is a block diagram illustrating relationships between a digital magnetic tape unit, interface units and connections to control elements.
Figure 16:
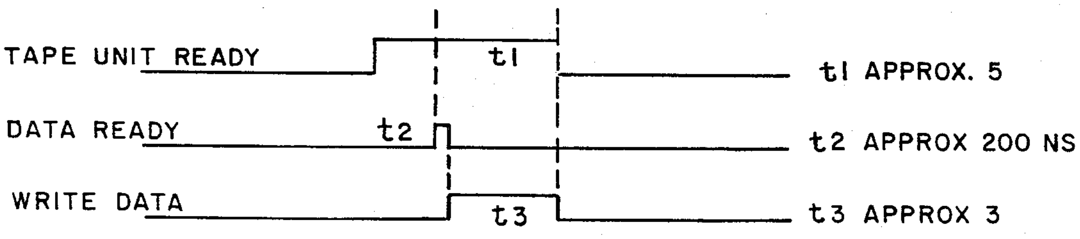
FIG. 16 illustrates timing sequences relevant to the operation of the components of FIG. 15, and FIGS. 17 and 18 are block diagrams depicting logic circuits interfacing the magnetic core and the tape unit.

A signal from the Core Memory Control CMC over terminal 1502 to the Tape Motion Interface 1512, as shown in FIG. 15, will start the tape moving in a tape unit 1500. At this time the tape unit will ramp up to speed and signal the Write Timing Interface 1514 to transfer one line of data over 1506 and 1516 to the tape unit along with a signal to write it on tape. When the tape unit is ready for another line of data, it signals the Write Timing Interface 1514 which, over terminal 1504, will request one line from the Core Control. When the data is at the data interface, the Write Interface is signaled to write the data on tape. This happens for each line of data until the run signal is removed, at which time the tape unit stops to write one line of data. The timing sequence is indicated in FIG. 16.

MAGNETIC TAPE CONTROL - 9 TRACK

Figure 17:
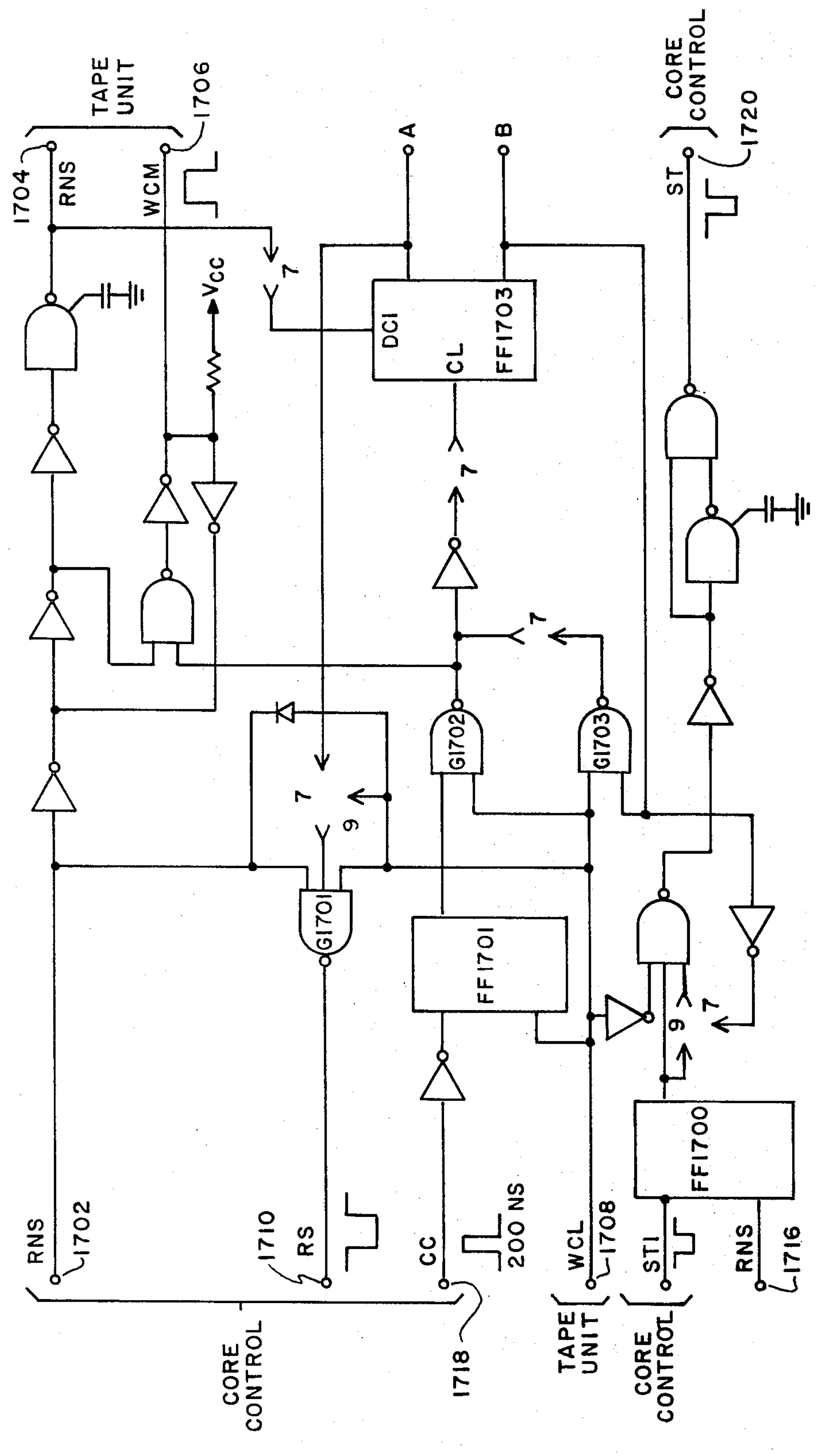

A positive signal on the RNS lead 1702 from the core control in FIG. 17 will cause the tape unit to start by causing the RNS lead 1704 to the tape unit to go positive. When the tape unit is up to speed, it will put out a 5 microsecond positive pulse (WCL), on terminal 1708, 3 microseconds of which must be returned as a write Command (WCMO on terminal 1706 to write the data. The WCL is gated also through G 1701 since RNS is high. The negative pulse RS on terminal 1710 will cause the Core Control to put data on the data gates in FIG. 18. When the Core Control has done this, it signals the Tape Control with a 200 NS pulse (CC), over terminal 1718, which will set FF 1701 causing G 1702 to have two positive inputs for the duration of WCL. After WCL goes negative, FF 1701 is reset. The output of G 1702 is gated in G 1704 with the RNs signal from 1702 and out on the WCM lead 1706 to the tape unit. This procedure is repeated for each line of data until the Core Control has completed its data transfer, at which time a negative pulse ST1, or 1714, sets FF 1702 and when the WCL pulse has gone, a negative pulse (ST) is transmitted to the Core Control over 1720, which will then remove the RNS signal. When the RNS signal goes negative FF 1702 is reset.

MAGNETIC TAPE CONTROL - 7 TRACK

Data is received from the Core Control in words of 8 bits so for 7 track tape one line of data must be put on two lines on tape, four bits per line.

Figure 18:
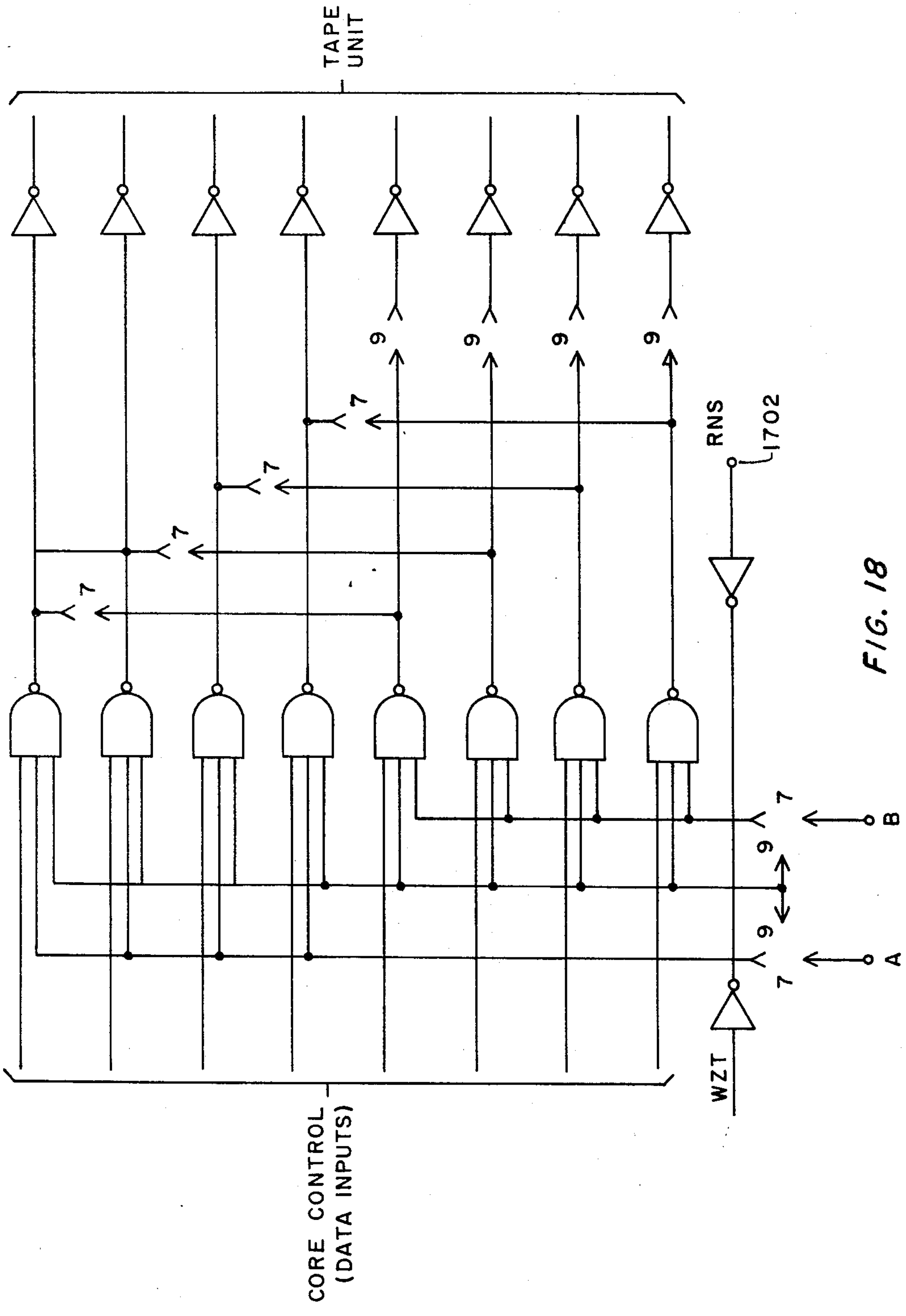

The RNS signal is received as with 9 track. When the first WCL is received a RS pulse is returned to the Core Control. The CC signal sets FF 1701 and a positive pulse is sent out over the WCM lead 1706 to the tape unit. FF 1703 has the A lead high, since it has been held high by RNS being low on the DC 1 input. The first WCM will write the first four data bits, since A is high and B is low (FIG. 18). On the negative or falling edge of the WCM pulse FF 1703 changes state and inhibits G 1701 so the next WCL will not generate a RS signal to the Core Control. The next WCL will, however, be gated directly through G 1703 and on to the WCM lead and write the last four bits of the word setting on the input gates. When WCM goes negative FF 1703 is reset and the circuit is ready for another 8 bit word from the Core Control, which will be called with the next WCL. This cycle will repeat itself until the Core Control signals (ST1) the Tape Control to stop the tape unit. This signal will appear on the first WCL of a cycle so FF 1702 will remain set and waiting until B of FF 1703 goes low and WCL is low (this indicates both of the four bit segments of the 8 bit word have been written). At that time the ST signal is transmitted to the Core Control which will remove the RNS signal.

While the principles of the invention have been described above in connection with specific apparatus and applications, it is to be understood that this description is made only by way of example and not as a limitation on the scope of the invention.

I claim:

1. A system of use with a telephone switching network for gathering, recording and ticketing billing data for automatic telephone toll centers, in which a format control circuit comprises scanner control means for receiving initial entry signals indicating a demand for service over toll lines, data input means for receiving data signals indicating calling and called party numbers, scanner means coupled to be controlled by said scanner control means responsive to said initial entry signals, said scanner means scanning said data input means to provide information signals and control signals, and logic means for applying selected information signals and selected control signals to a core memory control for recording in a core memory.

2. A system as claimed in claim 1, in which said scanner control means includes means responsive to said initial entry signals to generate first control signals for memory means and second control signals for said scanner, and said scanner means includes responsive to said second control signals to provide additional control signals for the memory means.

3. A system as claimed in claim 1, in which said scanner control means includes means responsive to said initial entry signals to generate first control signals for memory means and second control signals for said scanner, and said scanner control means includes means responsive to signals from the memory means to modify said second control signals.

4. A system as claimed in claim 1, in which said scanner control means includes means responsive to said initial entry signals to generate first control signals for memory means and second control signals for said scanner, and said scanner control means includes means responsive to signals from said scanner means to regulate said scanner control and reset it to a neutral state.

5. A system as claimed in claim 1, in which said scanner control means comprises:

logic means responsive to said initial entry signals to initiate a sequence of scanning pulses, and means coupling said scanning pulses to said scanner means to enable the scanner means to scan said data signals.

6. a system as claimed in claim 1, in which said scanner means comprises a chain of flip-flop circuits responsive to signals from said scanner control for controlling a plurality of gate circuits to provide scanning signals to said data input means, and a plurality of additional gate circuits responsive to entry type signals from said scanner control to provide additional scanning signals.

7. A system as claimed in claim 1, in which said data input means includes interface means for interconnecting an electrically noisy electromechanical system and an electronic system where the data is derived from the electromechanical system.

8. A system as claimed in claim 1, in which said data input means includes a plurality of interface means for interconnecting an electrically noisy electromechanical system and an electronic system, and said interface means includes relay means and a gate circuit, said relay means responding to signals from an electromechanical system to provide an operate signal through an electrostatically shielded relay contact to said gate circuit.

* * * * *